United States Patent
Iotti

(10) Patent No.: US 11,584,626 B2
(45) Date of Patent: Feb. 21, 2023

(54) ELECTRIC TELEHANDLER

(71) Applicant: MANITOU ITALIA S.R.L., CASTELFRANCO EMILIA (IT)

(72) Inventor: Marco Iotti, Reggio Emilia (IT)

(73) Assignee: MANITOU ITALIA S.R.L., Castelfranco Emilia (IT)

( * ) Notice: Subject to any disclaimer, the term of this patent is extended or adjusted under 35 U.S.C. 154(b) by 545 days.

(21) Appl. No.: 16/521,905

(22) Filed: Jul. 25, 2019

(65) Prior Publication Data

US 2020/0031643 A1 Jan. 30, 2020

(30) Foreign Application Priority Data

Jul. 27, 2018 (IT) ......................... 102018000007590
Apr. 2, 2019 (IT) ......................... 102019000004917

(51) Int. Cl.
*B60L 50/61* (2019.01)
*B66F 9/075* (2006.01)
(Continued)

(52) U.S. Cl.
CPC ............ *B66F 9/07572* (2013.01); *B60K 1/02* (2013.01); *B60K 6/46* (2013.01); *B60K 7/0007* (2013.01); *B60L 1/003* (2013.01); *B60L 1/006* (2013.01); *B60L 50/15* (2019.02); *B60L 50/60* (2019.02); *B60L 50/61* (2019.02); *B66F 9/0655* (2013.01); *B66F 9/075* (2013.01);
(Continued)

(58) Field of Classification Search
CPC .... B66F 9/07572; B66F 9/0655; B66F 9/075; B66F 9/07581; B66F 9/22; B60K 1/02; B60K 6/46; B60K 7/0007; B60K 2001/001; B60K 2007/0092; B60L 1/003; B60L 1/006; B60L 50/15; B60L 50/60; B60L 50/61

See application file for complete search history.

(56) References Cited

U.S. PATENT DOCUMENTS 3,270,899 A * 9/1966 Woolman .............. B60P 1/5433
414/718
9,120,651 B1 * 9/2015 Bailey ................... B66F 9/0755
(Continued)

FOREIGN PATENT DOCUMENTS

CN 107709221 A 2/2018
EP 1090874 A1 * 4/2001 ............... B60K 6/32
(Continued)

OTHER PUBLICATIONS

EPO, third party observations, prior art and NPL dated Sep. 21, 2011 and Dec. 26, 2012, entire document (Year: 2012).*
(Continued)

*Primary Examiner* — Jacob B Meyer
(74) *Attorney, Agent, or Firm* — Pearne & Gordon LLP; John P. Murtaugh

(57) ABSTRACT

Described is an electric telehandler (1) comprising: one or more traction apparatuses (3, 51, 6) equipped with a drive wheel (3); movement means comprising a plurality of hydraulic actuators, a hydraulic distributor (2) to actuate the actuators and a pump (21) for supplying the distributor (2); and an electric motor (4, 41, 42, 43, 44, 45, 46, 47, 48, 49) connected directly to the traction apparatus and/or to the pump (21) of the movement means.

24 Claims, 9 Drawing Sheets

(51) Int. Cl.
*B66F 9/22* (2006.01)
*B60K 1/02* (2006.01)
*B60L 50/60* (2019.01)
*B60K 7/00* (2006.01)
*B60K 6/46* (2007.10)
*B60L 50/15* (2019.01)
*B60L 1/00* (2006.01)
*B66F 9/065* (2006.01)
*B60K 1/00* (2006.01)

(52) U.S. Cl.
CPC ............ *B66F 9/07581* (2013.01); *B66F 9/22* (2013.01); *B60K 2001/001* (2013.01); *B60K 2007/0092* (2013.01); *B66F 9/07559* (2013.01)

(56) References Cited

U.S. PATENT DOCUMENTS

| | | | |
|---|---|---|---|
| 10,457,534 B2 | 10/2019 | Hegewald et al. | |
| 2002/0104239 A1* | 8/2002 | Naruse | B60K 6/44 903/903 |
| 2013/0230376 A1 | 9/2013 | Soma'et al. | |
| 2015/0122762 A1* | 5/2015 | Hong | B60L 50/52 180/65.21 |
| 2017/0001846 A1 | 1/2017 | Paavolainen | |
| 2019/0023544 A1 | 1/2019 | Hegewald et al. | |
| 2020/0031643 A1* | 1/2020 | Iotti | B66F 9/07581 |
| 2021/0016648 A1* | 1/2021 | Iotti | B66F 9/07572 |

FOREIGN PATENT DOCUMENTS

| | | | | |
|---|---|---|---|---|
| EP | 2536583 B1 | 9/2014 | | |
| EP | 3112312 B1 | 1/2017 | | |
| EP | 3599213 A1 * | 1/2020 | ............... | B60K 1/02 |
| FR | 3015452 A1 * | 6/2015 | ................ | B66F 9/24 |
| GB | 2337965 A | 12/1999 | | |
| WO | WO-2010036361 A * | 4/2010 | ............... | B61B 1/00 |
| WO | 2011128772 A1 | 10/2011 | | |
| WO | WO-2011148052 A1 * | 12/2011 | ............ | B60K 11/02 |
| WO | 2012146956 A1 | 11/2012 | | |
| WO | 2017072241 A1 | 5/2017 | | |

OTHER PUBLICATIONS

Galizia, "Multis—Electric multipurpose crane / telehandler", Sep. 21, 2011, pp. 1-2, XP055947791.

* cited by examiner

ELECTRIC TELEHANDLER

This invention relates to an electric telehandler; in detail, the invention relates to a telehandler which can be either hybrid or "full-electric", that is to say, completely electric.

There are prior art telescopic handlers ("telehandlers") consisting of a vehicle equipped with a movable frame on wheels, a driver's cab and an operating arm which can be extended telescopically.

At the distal end of the arm there is an apparatus for lifting and/or moving loads, such as, for example, a fork, a cage, a lateral transfer unit, a hoist, etc.

Traditionally, telehandlers are equipped with an internal combustion engine A, of the diesel type, which drives a hydrostatic pump B which controls a hydrostatic motor C acting on one of the differentials D1, which is in turn connected to the other differential D2 by means of a Cardan shaft E, so as to rotate the four wheels R on which the vehicle is moved (see diagram in FIG. 1).

Moreover, the same hydrostatic pump B controls the drive F for actuating the hydraulic distributor G, which in turn drives the cylinders which produce the movements, for example of the arm, of the apparatus, etc. Recently, in order to reduce energy consumption and improve environmental sustainability, electro-hydraulic telehandlers have been developed, equipped with an internal combustion engine, an electric motor, powered by a battery and a hydrostatic transmission.

However, the prior art hybrid solutions do not fully overcome the efficiency limits and the problems of significant noise and pollution which traditionally adversely affect telehandlers and other work vehicles.

In this context, the technical purpose which forms the basis of the invention is to provide a telehandler with electric propulsion which overcomes the limitations of the prior art.

The aim specified is achieved by a telehandler made according to claim 1. Further features and advantages of this invention are more apparent in the non-limiting description of a preferred but non-exclusive embodiment of an electric telehandler, as illustrated in the accompanying drawings, in which:

Figure 1:
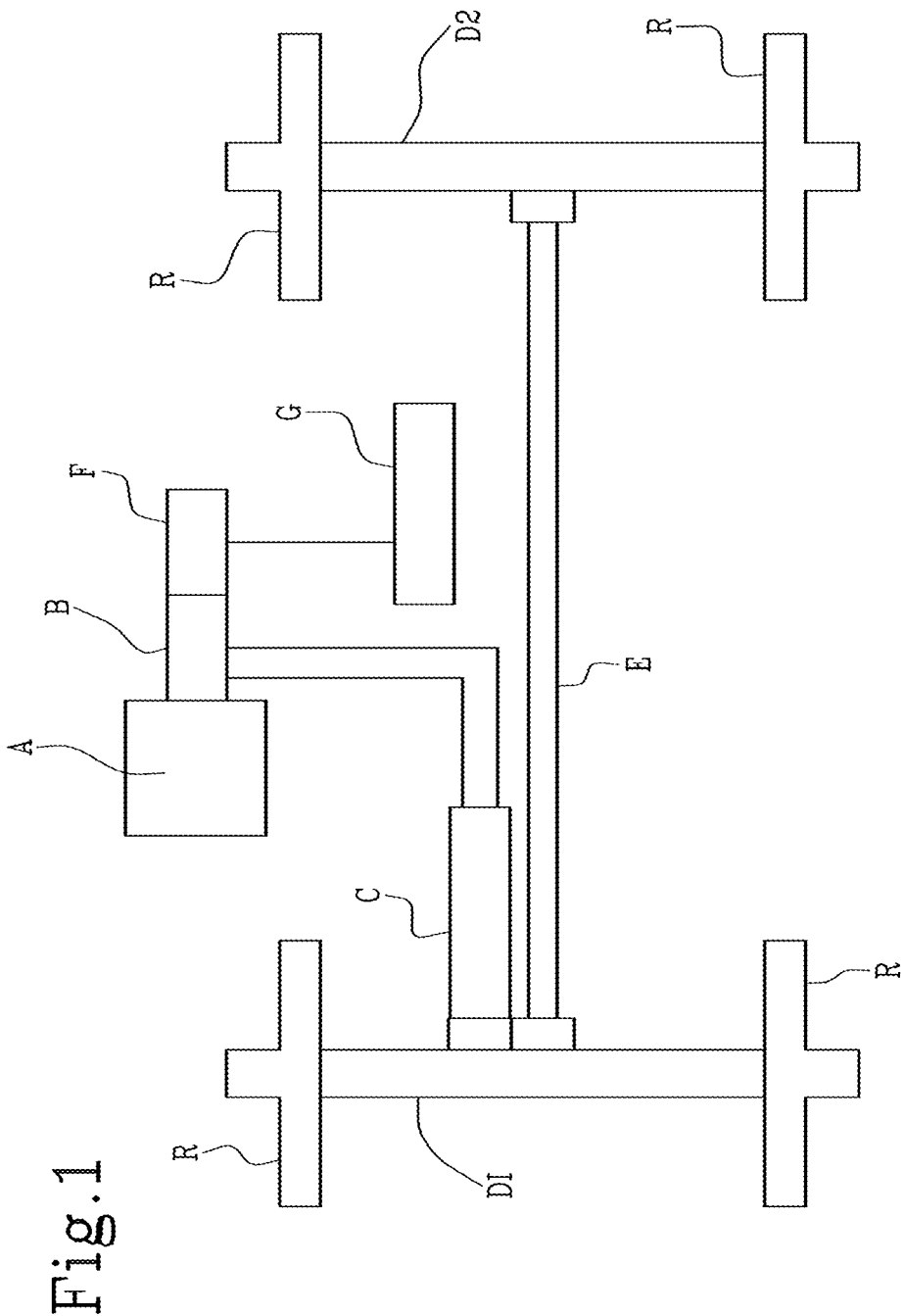
FIG. 1 is a diagram schematically representing the propulsion system of a telehandler according to the prior art.
Figure 2:
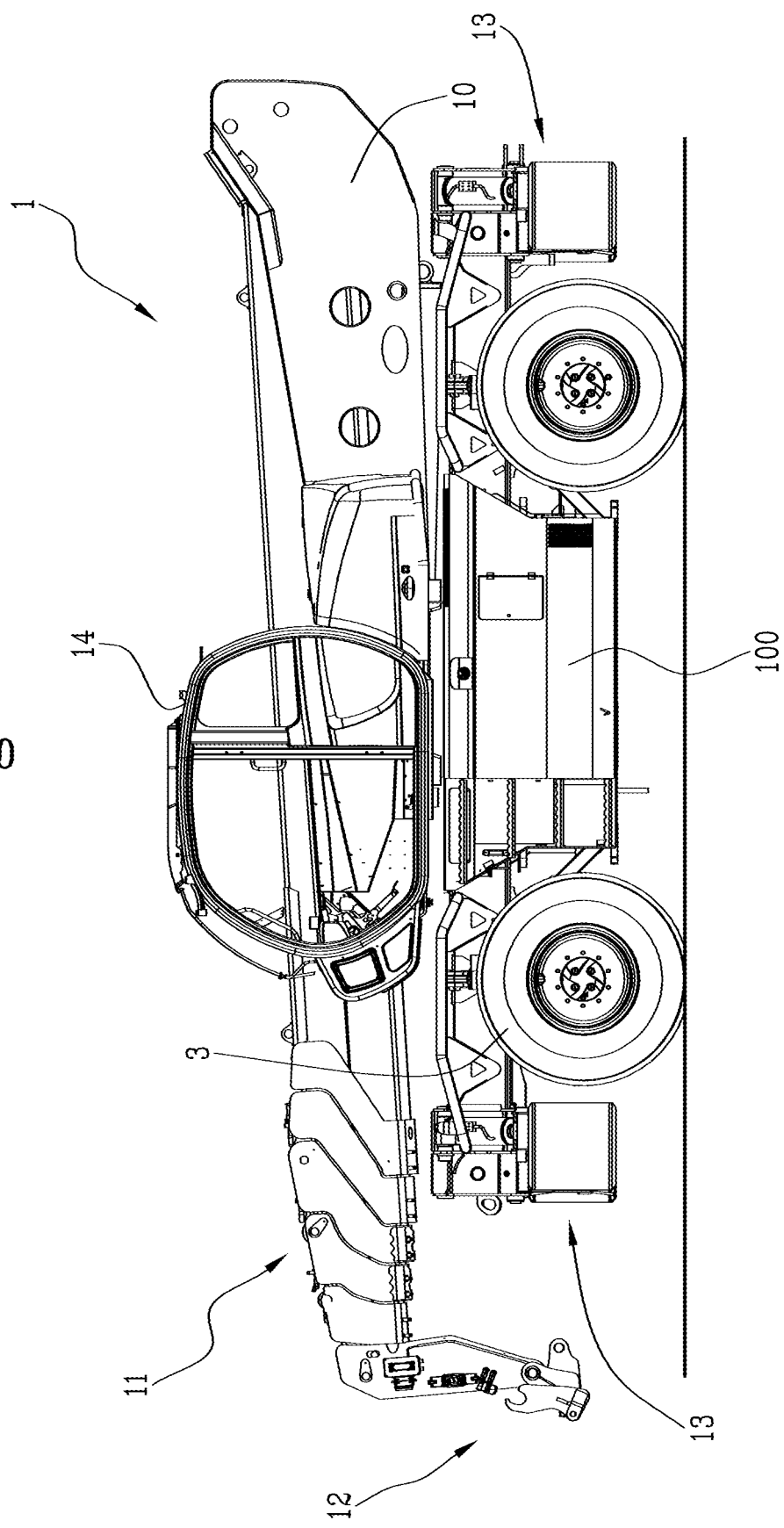
FIG. 2 is a side view of one of the possible telehandlers made according to the invention.

With reference to the accompanying drawings, the numeral 1 denotes in its entirety telehandler with electric propulsion according to the invention. The proposed telehandler 1 can be fixed and rotary, and, in the second case, it is equipped with a rotary tower 10, moved by a hydraulic actuator. In both cases, the invention includes a lifting arm 11, hinged to the frame or the tower 10, which can be lifted and telescopically extended using special actuators, in particular, hydraulic cylinders.

Moreover, at its distal end, the arm 11 is provided with a coupling device 12 which allows the apparatus to be hooked up and replaced, which can in turn be equipped with a hydraulic actuator.

Moreover, the telehandler 1 is equipped with stabilisers 13 whose arms can be driven by respective hydraulic actuators, for example hydraulic cylinders.

The hydraulic actuators present in the telehandler 1 are preferably all driven by means of a hydraulic distributor 2, mounted on board the vehicle 1, which is driven by a hydraulic pump 21; the pump 21, the distributor 2 and all the actuators, plus any other components which contribute to the movements of the telehandler 1, excluding the translation, will hereafter be referred to in their entirety as "movement means".

Moreover, the telehandler 1 according to the invention can be equipped with a cab 14 or be without a cab and therefore only be controlled remotely, as described in more detail below.

In general, the telehandler 1 proposed, apart from the inventive aspects described here, can have the same features as the prior art telehandlers.

The telehandler 1 according to the invention includes four drive wheels 3 which can be actuated in various ways, according to different embodiments of the invention; in general terms, the invention includes traction apparatuses 3, 51, 52 which include respective drive wheels 3.

According to an important aspect of the invention, the telehandler 1 is equipped with one or more electric motors 4, 41, 42, 43, 44, 45, 46, 47, 48, 49 which are connected directly to the traction apparatuses and/or the movement means, without the interposing of any further hydraulic component, in particular without the use of a hydrostatic drive.

In particular, between the electric motor (or the electric motors) 4, 41, 42, 43, 44, 45, 46, 47, 48, 49 and the drive wheels 3 there can be defined a transmission which is free of hydraulic components, in particular there is no hydrostatic engine and is therefore exclusively mechanical.

It should be noted that each electric motor 4, 41, 42, 43, 44, 45, 46, 47, 48, 49 according to the invention is equipped with an electronic control unit, such as, for example, an inverter and the required operational electronics, and it can be equipped with a cooling system, for example of the water type.

The following four possible embodiments of the invention, relating to the drive, transmission and traction, presented in order of increasing efficiency, are described below, which do not exhaust the possible embodiments of the proposed telehandler 1.

Figure 3:
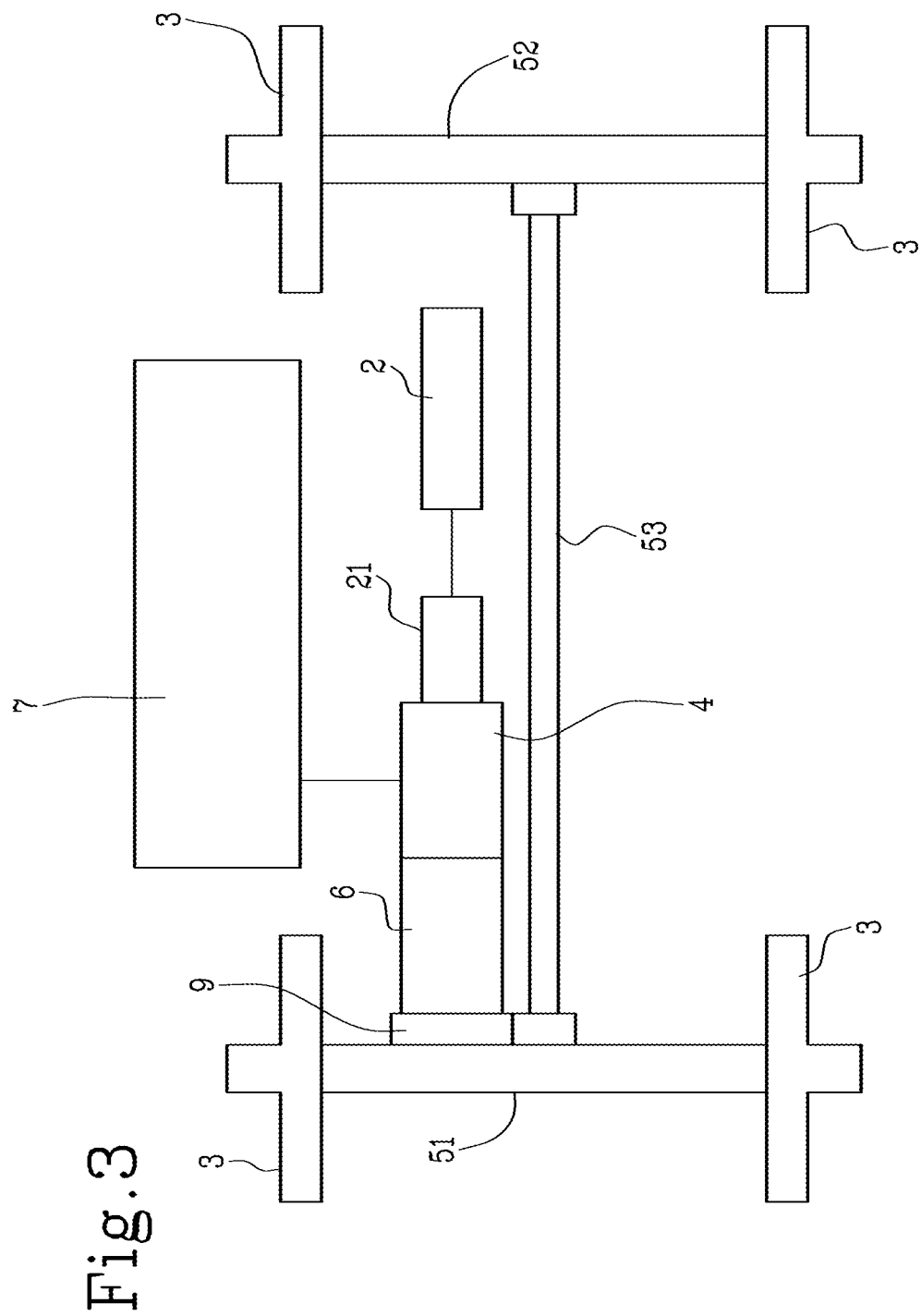
FIG. 3 is a diagram schematically representing the propulsion system of a telehandler, made according to a first embodiment.

According to a first embodiment, schematically illustrated in FIG. 3, the telehandler 1 includes two traction apparatuses, of which one at the front and one at the rear, which each comprise a respective axle 51, 52, at the opposite ends of which the drive wheels 3 are fixed; the two axles 51, 52 are joined by a Cardan joint 53.

One of the traction apparatuses, for example the front one, is equipped with a coupler 6, equipped with a clutch, by means of which the electric motor 4 connects to the axle 51.

Moreover, the invention can comprise the use of gears 9, for example with two ratios, designed to allow the connection between elative electric motors and the axles 51, 52.

The gears 9 can be flanged directly on the axles 51, 52, as shown in FIGS. 3, 4, 5, 7, 8 and 9, or, according to a version not illustrated, they can be positioned in line with and connected to the axles by means of two relative Cardan joints.

Moreover, according to all the embodiments and versions of the invention, wherein the traction apparatuses comprise a kinematic mechanism for connecting between the electric traction motor 4, 41, 43, 44 and the wheels 3, it is possible to provide a gear motor for the connection between the above-mentioned motor and the mechanics of the relative traction apparatus.

In fact, whilst the mechanics usually used in this type of vehicle 1 are designed to operate at approximately 4000 to 5000 revs, the electric motor reaches at 8000-10000 revs.

The same motor 4 is also connected to the pump 21 which drives the dispenser 2.

By means of this configuration, both the translation of the vehicle 1 and the activation of its movements can be produced with a single electric motor 4.

The telehandler 1 is also provided with an electric battery or battery pack 7 for powering the motor 4, which can be recharged by means of an external energy source, such as, for example, the electricity network.

It should be noted that the battery pack 7 (or the packs 7, 7') of this and the other embodiments and versions of the invention can be of the lithium iron phosphate type, which is particularly suitable for this application, where the operating temperatures are sometimes quite high, since they are batteries with a very low risk of fire or explosion.

According to a second embodiment, shown in FIGS. 4, 7, 8 and 9, which is similar but not identical to the first, there are two electric motors 41, 42, of which a first motor 41 is connected to a traction apparatus 3, 51, whilst a second motor 42 is connected to the pump 21 of the movement means.

In this case, the coupling device 6 provided in the first embodiment is not necessary and the first motor 41 is connected directly to one of the two axles 51, 52, which are always joined by the Cardan shaft 53.

Figure 4:
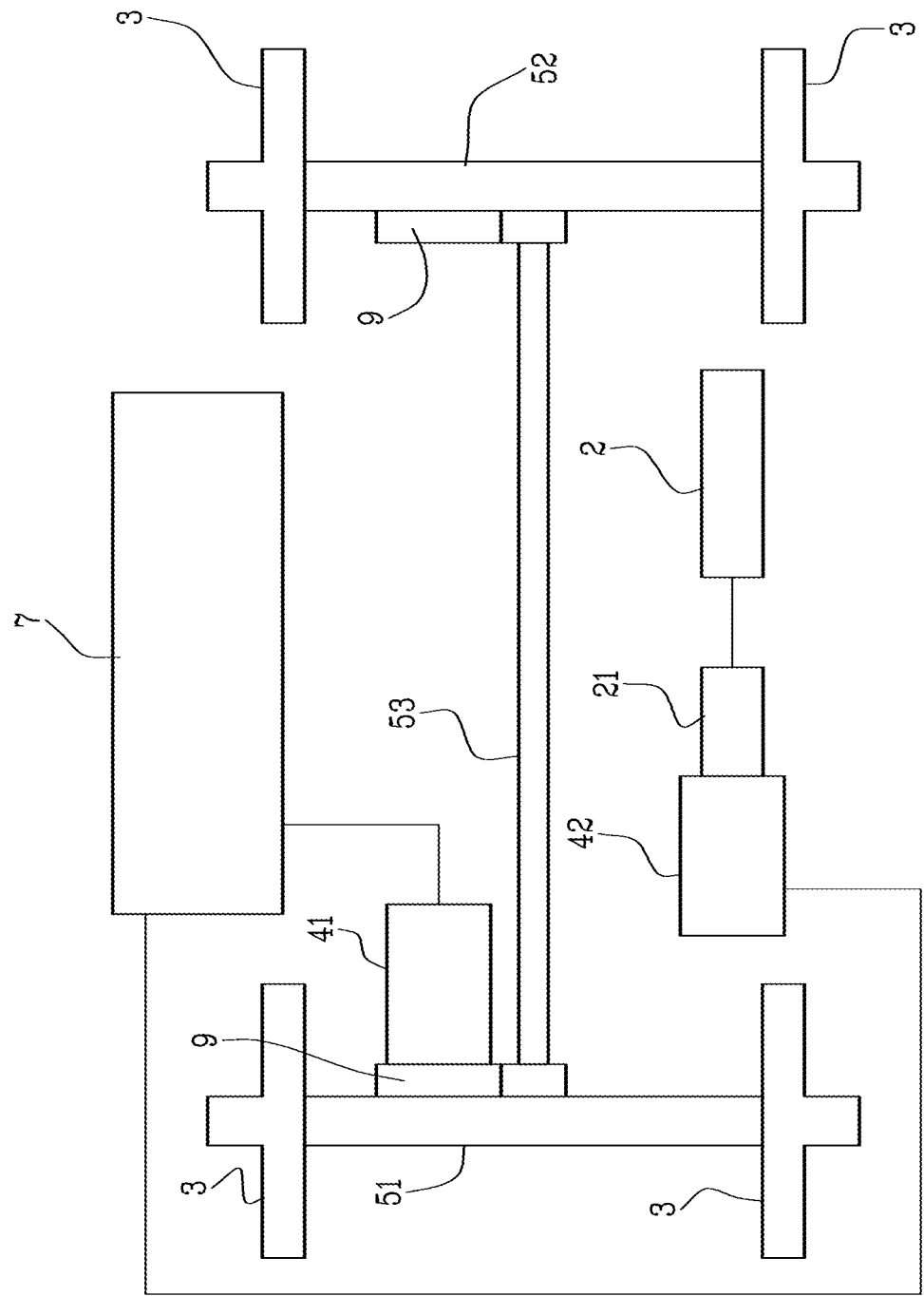
FIG. 4 is a diagram schematically representing the propulsion system of a telehandler, made according to a second embodiment.

According to a first version of this embodiment, shown in FIG. 4, a same battery, or same battery pack 7, powers both the motors 41, 42 and clearly is on board the vehicle 1.

Figure 7:
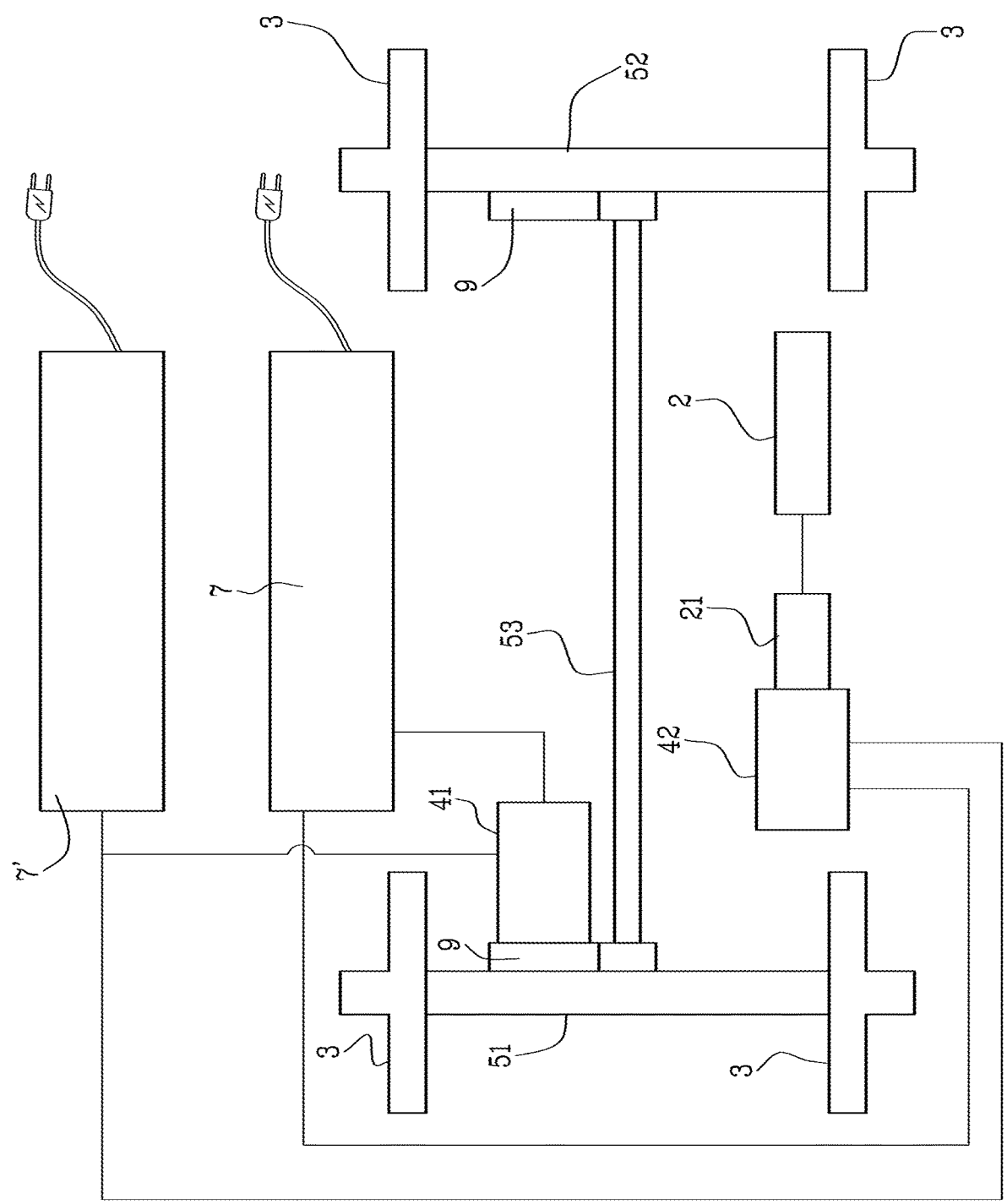
FIG. 7 is a diagram schematically representing the propulsion system of a telehandler according to a second version of the embodiment of FIG. 4.

According to a second version, shown in FIG. 7, the telehandler 1 includes at least two battery packs 7, 7' both connected to the two electric motors 41, 42.

Obviously, the number of packs 7, 7' determined by the required autonomy.

In fact, if the telehandler 1 does not have a cab or is in any case designed to be transported with a self-powered truck or similar between the place of work and the storage site, it is not necessary to have more than one battery pack 7, although a plurality of packs 7, 7' is certainly not a drawback.

If greater autonomy is required, for example for road travel between nearby intervention sites, the version according to FIG. 7, equipped with two packs 7, 7' is more convenient.

Both in the version with one battery pack 7 and with multiple battery packs 7, 7', the telehandler 1 is equipped at the height of the carriage, that is to say, of the frame carried by the wheels which supports the arm 11, the tower 10 and/or the cab, with external electrical sockets, connected to the batteries 7, 7', for supplying power to external users, such as, for example, work tools (drills, screwdrivers, demolition hammers, etc.).

Figure 8:
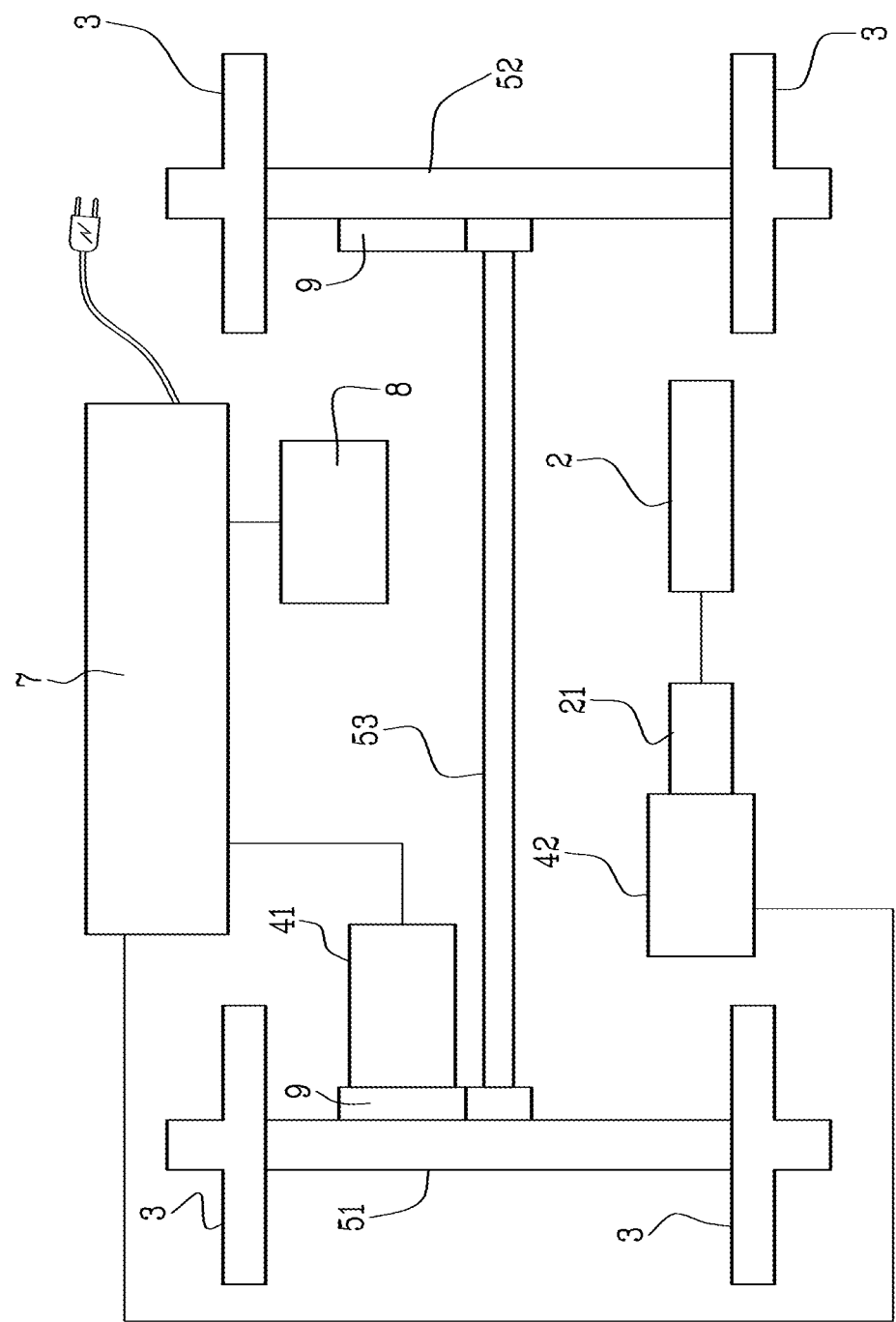
FIG. 8 is a diagram of a third version of the embodiment of the invention according to FIGS. 4 and 7; e
Figure 9:
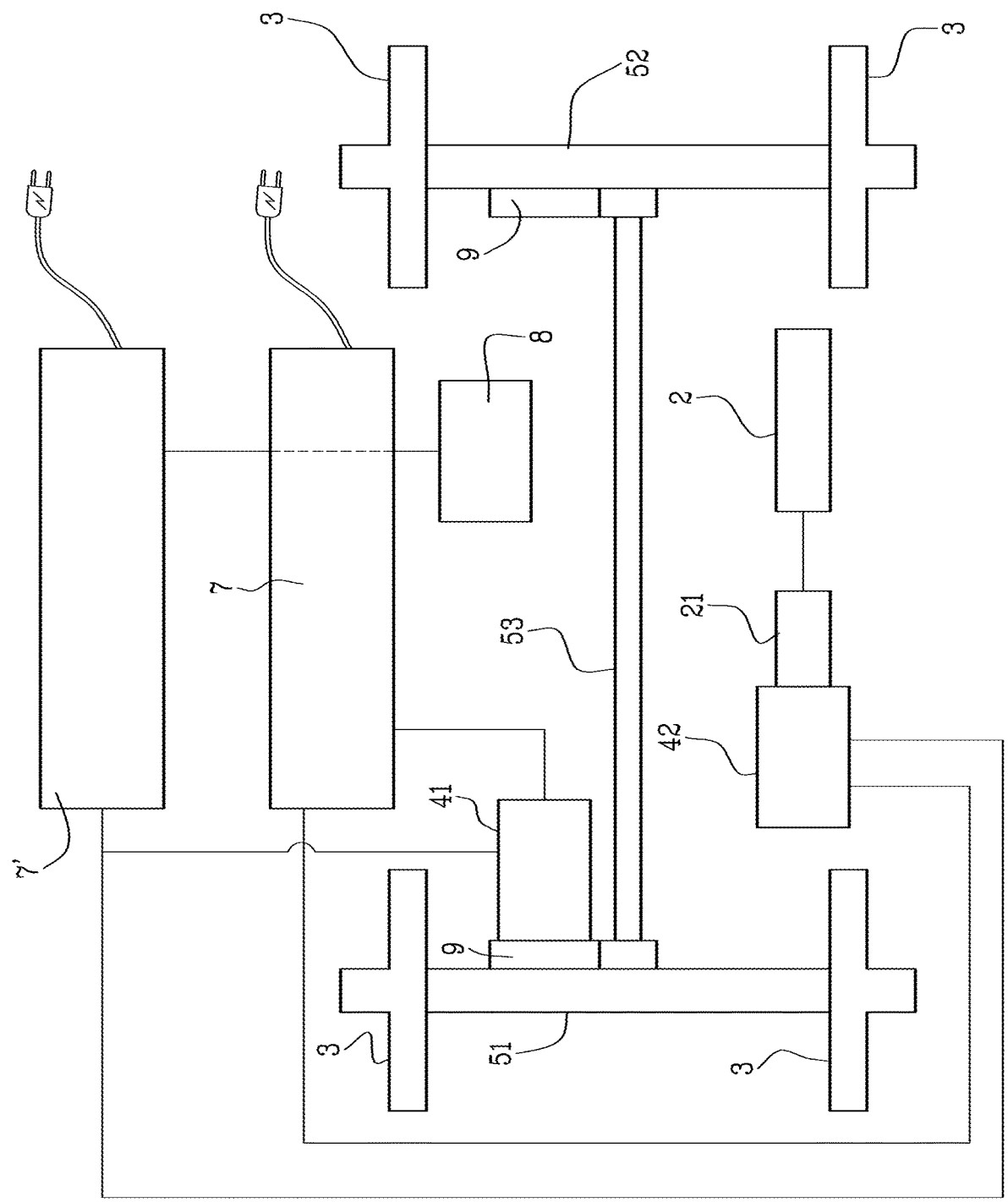
FIG. 9 is a diagram of a further version of the embodiment of FIGS. 4, 7 and 8.

It should be noted that, as already explained above, the battery packs 7, 7' of all the embodiments and versions of the invention can be recharged by means of the electricity network, in the so-called "plug in" manner, even though this feature has been schematically illustrated only in FIGS. 7, 8 and 9, for simplicity of description.

According to another version of the embodiment, shown in FIG. 8, the battery pack 7 is connected to an internal combustion engine 8, preferably but not exclusively a diesel engine, for example of the so-called "stage 5" type.

According to the invention, the internal combustion engine 8 is designed exclusively for charging the battery 7 (or batteries 7, 7') or battery packs 7, 7'.

The internal combustion engine 8 is equipped with a tank for the fuel and is set up, by use of a generator, for recharging the battery 7.

This hybrid configuration allows the autonomy of the telehandler 1 to be increased, allowing it, for example, to increase road travel.

According to a preferential, but non-binding aspect, the internal combustion engine 8 is housed in a container or "drawer" which can be extracted and closed in a concealed fashion by/in the carriage of the telehandler 1, to facilitate the maintenance; alternatively, the engine can be accessible by means of a hatch formed in the bonnet of the carriage.

FIG. 9 shows a further version of the telehandler 1 with two electric motors 41, 42, which comprises at least two battery packs 7, 7', each rechargeable as necessary using the internal combustion engine 8.

It should be noted that, according to the proposed telehandler 1, the internal combustion engine 8 is used exclusively for charging batteries and is disconnected from the electric motors 41, 42.

The invention can include a control unit configured to automatically control the actuation of the recharging internal combustion engine 8, if it detects that the charge contained in the batteries 7, 7' has dropped below a predetermined threshold.

The description of the various versions of the second embodiment of the invention relating to the battery packs 7, 7' and the internal combustion engine 8 can also be applied to the various embodiments of the invention described here, mutatis mutandis; the description of the various options illustrated above will therefore not be repeated for each other embodiment, even if it is understood to be optionally applicable.

Figure 5:
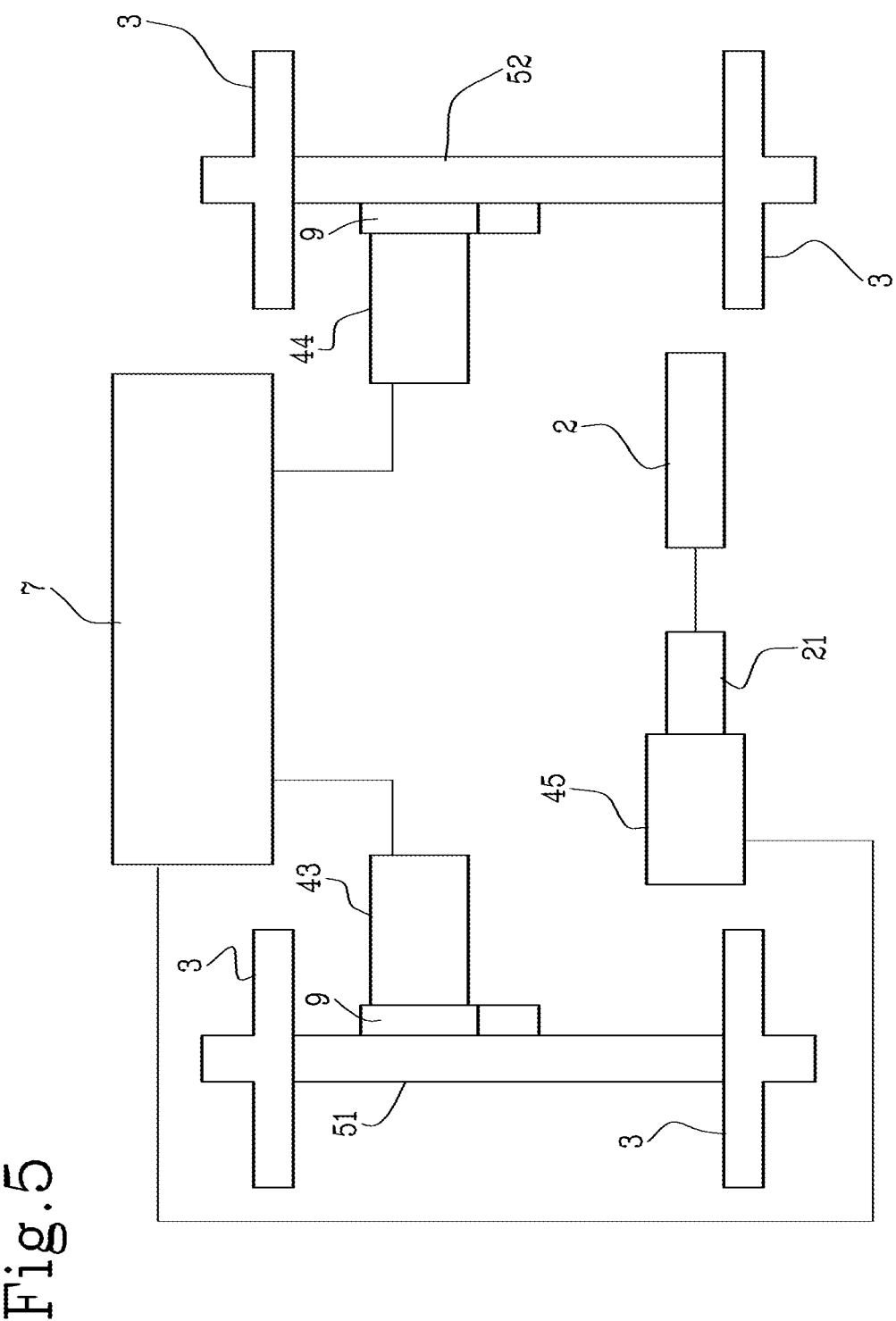
FIG. 5 is a diagram schematically representing the propulsion system of a telehandler, made according to a third embodiment.

According to a third embodiment, the invention comprises two electric motors 43, 44 for moving the two traction apparatuses 3, 52, 52, each connected directly to a respective axle 51, 52, as shown schematically in FIG. 5.

In this case, it is no longer necessary to use the Cardan shaft used in the embodiments described above.

In common with the second embodiment, an electric motor 45 is used dedicated to the movement means 2, 21, connected directly to the pump 21 which supplies the distributor 2.

The three electric motors 43, 44, 45 are all powered by the same battery pack 7.

Figure 6:
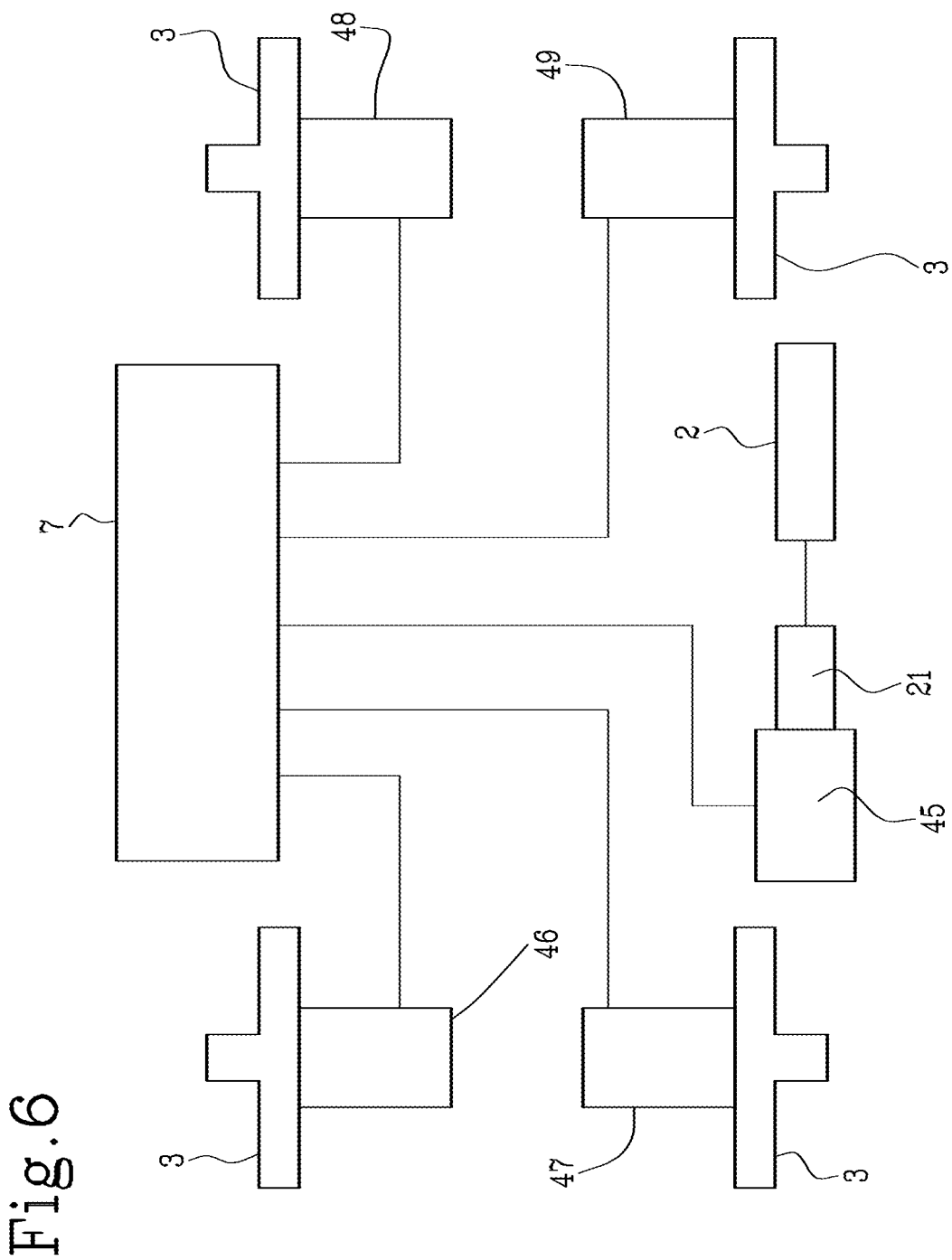
FIG. 6 is a diagram schematically representing the propulsion system of a telehandler, made according to a fourth embodiment.

According to the fourth embodiment, schematically illustrated in FIG. 6, the telehandler 1 comprises four drive apparatuses 3, 46, 47, 48, 49, each comprising a relative drive wheel 3, each of which is driven by a respective electric motor 46, 47, 48, 49.

In this case, it is no longer necessary to provide the axles connecting the wheels according to the other embodiments described here.

The four motors 46, 47, 48, 49 are powered by the same battery pack 7, located on the vehicle 1.

The invention as articulated in the four embodiments described above, or in possible other versions which implement the inventive concept proposed, makes it possible to obtain the translation and the movements of the telehandler 1 thanks to an exclusively electric propulsion, without hydrostatic transmission, thus representing an improvement with respect to the prior art, in terms of efficiency, noise and environmental sustainability.

As mentioned above, the electric telehandler 1 according to the invention can also be completely remote controlled, without a cab and the related controls located in it which, in prior art vehicles, are operated manually.

In practice, the commands for driving the vehicle, movement of the arm and operation the stabilisers are not located on the vehicle but are positioned on a remote control unit, for example a radio remote control unit.

In this case, control means are provided, located on the telehandler 1 and designed to manage the operation of the motor or motors and the distributor 2.

The control means, which can include an electronic control unit (also of the type normally present on the telehandlers 1) or other electronic processing unit, are designed to receive control signals from the remote control unit and are designed to control the operation of the motor and the distributor 2 as a function of the control signals received.

According to one particular embodiment, which is actuated in a rotary telehandlers, the tower 10 is electrically operated.

More specifically, the rack for moving the tower 10 can be connected to a worm screw, integrated or not in a rotation table, the screw being in this case actuated by an electric motor, connected to the control unit and to the commands in the cab.

It should be noted that, in principle, there are various types of application of the electric actuation of the tower, even without a rack, such as, for example, the use of a linear motor with curved magnets which define a circular path.

Advantageously, regardless of the type of electric actuation selected, the motor means for rotation of the rack are powered by the battery pack or battery packs 7, 7' of the type already mentioned above.

The version with an electric tower can be combined with the other different embodiments illustrated in this description.

The invention claimed is:
1. An electric telehandler (1), comprising:
a telescopically-extendable operating arm which is oriented substantially horizontally when not in use;
a first traction apparatus (3, 51, 6) equipped with a first drive wheel (3);
movement means comprising a plurality of hydraulic actuators, a hydraulic distributor (2) to actuate said hydraulic actuators and a pump (21) for supplying said hydraulic distributor (2);
one or more onboard batteries or battery packs; and
a first electric motor (4, 41, 42, 43, 44, 45, 46, 47, 48, 49) powered by said one or more onboard batteries or battery packs and connected directly to said first traction apparatus and operable to drive said first traction apparatus;
wherein (a) the electric telehandler (1) is free from the presence of an onboard internal combustion engine or (b) the electric telehandler (1) is free from the presence of an onboard internal combustion engine except that it has a single onboard internal combustion engine connected and operable only for the purpose of recharging said one or more onboard batteries or battery packs.

2. The telehandler (1) according to claim 1, wherein the first electric motor drives the first drive wheel (3); wherein between the first electric motor (4, 41, 42, 43, 44, 45, 46, 47, 48, 49) and the first drive wheel (3) there is a transmission without hydraulic components.

3. The telehandler (1) according to claim 1, comprising a drive apparatus equipped with an axle, to which is fixed the first drive wheel, a second drive wheel and a coupler (6), equipped with a clutch, by which the first electric motor (4) is connected to said axle.

4. The telehandler (1) according to claim 3, wherein the first electric motor which is connected to the drive apparatus is also connected to the pump (21).

5. The telehandler (1) according to claim 1, comprising a second electric motor which is connected to the pump (21) of the movement means.

6. The telehandler (1) according to claim 5, wherein the second electric motor is powered by the one or more onboard batteries or battery packs.

7. The telehandler (1) according to claim 5, wherein the first electric motor is connected directly to a first axle fixed to the first drive wheel.

8. The telehandler (1) according to claim 7, comprising a second axle, each axle connecting a pair of drive wheels; a Cardan shaft (53) joining the two axles.

9. The telehandler (1) according to claim 7, wherein a third electric motor is connected directly to a second axle fixed to a pair of drive wheels.

10. The telehandler (1) according to claim 5, wherein the first drive wheel is connected directly to the first electric motor.

11. The telehandler (1) according to claim 10, comprising four drive wheels (3) connected directly to four respective electric motors (46, 47, 48, 49).

12. The telehandler (1) according to claim 11, wherein a single battery or a single battery pack of said one or more onboard batteries or battery packs powers all four of the four electric motors (46, 47, 48, 49).

13. The telehandler according to claim 1, said telehandler being without cabin and steering commands which can be operated manually and comprising an electronic control unit designed and configured for receiving control signals from a remote control and for regulating the operation of the first electric motor (4, 41, 42, 43, 44, 45, 46, 47, 48, 49) and the hydraulic distributor (2) in accordance with the control signals received.

14. The telehandler according to claim 1, comprising two onboard batteries or battery packs (7, 7') for powering one or more electric motors (4, 41, 42, 43, 44, 45, 46, 47, 48, 49) including the first electric motor.

15. The telehandler according to claim 5, comprising two onboard batteries or battery packs (7, 7') for powering said first and second electric motors (4, 41, 42, 43, 44, 45, 46, 47, 48, 49, and wherein both of the two onboard batteries or battery packs (7, 7') are connected to each of the first and second electric motors (41, 42, 43, 44).

16. The telehandler according to claim 1, comprising an onboard internal combustion engine (8) connected and operable only for the purpose of recharging said one or more onboard batteries or battery packs.

17. The telehandler according to claim 15, comprising an onboard internal combustion engine (8) connected and operable only for the purpose of recharging the onboard batteries or battery packs.

18. The telehandler according to claim 1, comprising a traction apparatus which includes a gear motor; said gear motor being coupled to a respective electric motor (4, 41, 43, 44).

19. The telehandler according to claim 1, comprising at least one external socket connected to said one or more onboard batteries or battery packs for powering external users.

20. The telehandler according to claim 16, wherein the internal combustion engine (8) is housed in a container which can be removed and closed.

21. The telehandler according to claim 1, comprising a rotatable tower (10) actuated electrically.

22. The telehandler according to claim 21, wherein the rotatable tower (10) is connected to a rotation rack engaged by a worm screw which is driven by an electric motor.

23. The telehandler according to claim 1, wherein said one or more onboard batteries or battery packs are of the lithium iron phosphate type.

24. The telehandler according to claim 1, wherein said telehandler comprises a driver's cab.

\* \* \* \* \*